3,431,196
HYDROCRACKING CATALYST AND PROCESS
Robert M. Dobres, deceased, late of Silver Spring, Md., by Amalie B. Dobres, executrix, Silver Spring, Md., and John L. Warthen, Baltimore, Md., assignors to W. R. Grace & Co., New York, N.Y., a corporation of Connecticut
No Drawing. Continuation-in-part of application Ser. No. 499,036, Oct. 20, 1965. This application Feb. 21, 1967, Ser. No. 617,711
U.S. Cl. 208—111          6 Claims
Int. Cl. C10g *13/04;* B01j *11/26*

ABSTRACT OF THE DISCLOSURE

Z-14 US zeolite promoted silica-alumina catalysts impregnated with from 2 to 12 percent nickel, cobalt and mixtures thereof are used in catalytic hydrocracking of hydrocarbons.

---

This is a continuation-in-part of application Ser. No. 499,036 filed Oct. 20, 1965 and now abandoned.

This invention relates to catalytic hydrocracking of high-boiling hydrocarbons to produce lower boiling hydrocarbons, boiling for example in the gasoline range and to superior catalysts for this process.

In summary, the process of this invention is a method for hydrocracking hydrocarbon feed-stocks to obtain lower boiling hydrocarbons which comprises subjecting said feed-stocks to hydrocracking conditions in the presence of added hydrogen and the catalyst of this invention, said catalyst comprising a member selected from the group consisting of from 2 to 12 percent of nickel, cobalt, or mixtures thereof deposited by impregnation or ion exchange on a silica-alumina-zeolite support, said support containing from 10 to 40 percent alumina and from 5 to 80 percent zeolite based on the weight of the silica, alumina, and zeolite in the composite, said zeolite consisting essentially of a synthetic ultra-stable crystalline aluminosilicate having the approximate formula, expressed in terms of mole ratios of oxides, as follows:

$$XM_{2/n}O:Al_2O_3:3.5-7SiO_2:0-9H_2O$$

wherein M represents at least one cation having a valence of not more than 4, $n$ represents the valence of M and X is from 0 to 1, said zeolite having an alkali metal content, expressed as the oxide, of less than one percent, a cubic unit cell size of from 24.20 to 24.45 Angstroms, and an ultra-stable structure as evidence by retention of a surface area of greater than 150 m.$^2$/g. after calcination at a temperature of 1725° F. for 2 hours.

In hydrocracking processes, the product value tends to decline during on-stream operation. A greater proportion of gaseous products are formed, the liquid yield is decreased, and the selectivity of the catalyst to produce the more valuable products decreases. Several factors contribute to this result, an important factor being loss of the catalyst surface area. During the hydrocracking cycle, the principal deactivating factor is coke formation on the catalyst. A secondary deactivating factor at this stage in the process is the loss of catalyst surface area from the steam produced from oxygen present in the feed. The coke formation does not cause a permanent loss of catalyst activity since the coke can be removed by burning during a regeneration cycle, thus reopening catalyst pores. However, some surface area is permanently lost during the regeneration cycle with conventional catalysts, causing a progressive loss in surface area.

Hydrocracking catalysts having a silica-alumina support have been previously disclosed. This support has a limited efficiency in producing the desired quantities of the more valuable products from hydrocarbon feed-stocks. Crystalline aluminosilicates such as synthetic faujasite have been proposed as supports in U.S. Patent No. 3,147,206 for example. The crystalline aluminosilicates which have been employed as supports, however, lack structural stability during the hydrocarbon cracking and regeneration cycles, and have a limited effective life in hydrocracking processes.

It is one object of this invention to provide a novel hydrocracking process and novel catalyst for this process which will effect improved yields of the more valuable products from petroleum feed-stocks.

It is another object of this invention to provide a novel hydrocracking process and a novel catalyst for this process which exhibits a sustained high activity and selectivity when subjected to the conditions present in hydrocracking and regeneration cycles.

All concentrations are herein given in terms of weight percents unless otherwise provided.

The support for the catalyst of this invention comprises a Z-14 US zeolite and silica-alumina.

Z-14 US zeolites and methods for their manufacture are described in application Ser. No. 318,249, filed Oct. 23, 1963 and now abandoned. The zeolite consists essentially of the synthetic ultra-stable crystalline aluminosilicate having the approximate formula, expressed in terms of mole ratios of oxide, as follows:

$$XM_{2/n}O:Al_2O_3:3.5-7SiO_2:0-9H_2O$$

wherein M represents at least one cation having a valence of not more than 4, $n$ represents the valence of M, and X is from 0 to 1. This zeolite has an alkali metal content, expressed as the oxide, of less than one percent, a cubic unit cell size of from 24.20 to 24.45 Angstroms and an ultra-stable crystalline structure as evidenced by retention of a surface area of greater than 150 m.$^2$/g. after calcination at a temperature of 1725° F. for 2 hours. The preferred cations represented by M include hydrogen, calcium, and magnesium.

The silica-alumina-zeolite support should contain from 10 to 40 and preferably from 13 to 35 percent alumina and from 5 to 80 and preferably from 15 to 50 percent zeolite based on the weight of the silica, alumina, and zeolite in the catalyst composite. The zeolite is preferably introduced into the silica-alumina matrix during its formation.

Silica-alumina composites can be made by the following typical procedure. A concentrated sodium silicate solution with a silica of alkali metal oxide weight ratio of from about 3–4 to 1 is diluted with water to a silica content of from about 3 to 8 percent. The silica is then gelled, using carbon dioxide as described in U.S. Patent 2,886,512, sulfuric acid or any other suitable gelling agent. The gelation is carried out at a temperature up to 165° F. The Z-14 US zeolite can be added during this stage of the process, either to the sodium silicate solution or to the initial silica gel slurry formed therefrom.

Following gelation, an aluminum salt solution is added to the gelled silicate in a quantity sufficient to provide the alumina content desired in the final catalyst. Any of the soluble aluminum salts can be employed as the aluminum ion source. Aluminum nitrate, aluminum chloride, aluminum sulfate, and the like give satisfactory results. Because of its relatively low cost, aluminum sulfate is the preferred reactant. When the silicate has been gelled with carbon dioxide and aluminum sulfate is used, the concentration of aluminum sulfate solution can be such as to neutralize all the alkali originating from the sodium silicate which has been converted by the carbon dioxide to sodium carbonate. Thus, the carbon dioxide can be liberated from the system by the aluminum sulfate and can be recovered and recycled for gelation of additional sodium silicate. At this stage of the process, the alumina has been precipitated, and the silica-alumina slurry is ready for filtration to separate the gel from the soluble reaction products. The Z-14 US zeolite can be introduced into the silica-alumina slurry at this point.

The silica-alumina matrix material which has been separated from the soluble reaction products by filtration is then dried. The Z-14 US zeolite can be introduced into the filtered matrix materials prior to the drying step. The silica-alumina-zeolite mixture can be dried in a conventional oven or furnace at temperature above about 350° F. The drying is continued until the total moisture content of the mixture is less than about 30 percent. Some hydrocracking processes employ catalyst pellets or granules. Other hydrocracking processes employ a fluid catalyst. The dried composite of this invention can be ground and sized in order to be suitable in fluid cracking processes. The ground material can be pelletized or extruded for use in hydrocracking processes employing larger catalyst particles. Spray-drying techniques are preferred for drying catalysts designed for use in fluidized beds. In the spray-drying process, the zeolite and matrix mixture is sprayed into the stream of air rising countercurrently in a drying chamber. The air inlet temperature is generally greater than 800° F. The spray-dried product is microspheroidal particles having a small, uniform particle size.

The spray-dried zeolite-matrix composite is then washed with a dilute ammonium salt solution to remove alkali metal ions from the composite. An ammonium sulfate solution is suitable for washing. The composite is then washed with water which is substantially free from sulfate ions, and redried to form the final support for the catalyst of this invention. The catalyst of this invention comprises the silica-alumina-zeolite support with from 2 to 12 percent and preferably from 3 to 7 percent of nickel, cobalt, or mixtures thereof deposited thereon.

The metal deposits on the supports are obtained by impregnating the supports with aqueous solutions of soluble salts or soluble complexes of the respective metal. Alternatively, the metals can be added by an ion exchange process. Suitable salts include the soluble acetates, chlorides, ammonium chlorides, nitrates, and sulfates of nickel and cobalt. Also amine complexes of nickel and cobalt can be employed. The impregnated support is then removed from the solution, dried and calcined at a temperature up to about 650° C. and preferably up to about 500° C. Reduction of the metal is obtained by heating the support in a reducing gas such as hydrogen, etc.

The hydrocracking process of this invention comprises passing the petroleum feed-stock in admixture with hydrogen over the catalyst at suitable temperatures, feed rates, pressures, etc. to effect a substantial conversion of the feed stock to lower boiling materials such as gasoline. Such hydrocracking processes are often referred to as destructive hydrogenation, hydrogenolysis, or in processes where the feed is essentially an alkaryl hydrocarbon, the process is often termed hydrodealkylation.

The hydrocracking conditions employed herein involve passing the vaporized hydrocarbons over the catalyst at temperatures ranging from 300 to 900° F., pressures from 500 to 3,000 p.s.i.g. and preferably from 1,000 to 2,000 p.s.i.g., and space velocities ranging from 0.5 to 5.0 volumes of feed per hour per volume of catalyst (GHSV). The preferred hydrogen:hydrocarbon mole ratios can range from 10 to 50.

Substantially any hydrocarbon can be used as the feedstock, except those of a purely aromatic nature which contain no alkyl groups. Feed stocks of special interest include straight run gas oils boiling between about 400 and 800° F., cycle oils from conventional cracking operations boiling generally in the gas oil range, heavy naphtha fractions, and alkylaromatic hydrocarbons in general. The process is especially valuable for converting light and heavy gas oils to naphthas boiling in the gasoline range and to premium quality fuel oils. When highly aromatic stocks are treated, it is preferred to use more severe temperature conditions, for example, the range of from 600° to 900° F. When the feed stock consists mainly of paraffinic or naphthenic hydrocarbons, it is preferred to use somewhat lower temperatures, for example, from 500° to 800° F.

Example 1

In this example a nickel impregnated catalyst of this invention was compared with similar platinum, rhodium, and palladium catalysts for hydrocracking activity.

The catalyst support employed contained 15 wt. percent Z-14 US zeolite in a silica-alumina matrix containing 13 wt. percent alumina. The catalyst support granules were sized to obtain particles retained on a 24 mesh screen and which passed through a 14 mesh screen (U.S. mesh). The support had the following analysis, given as weight percents.

T.V. @ 1750° F. ---------------------------- 12.0
$Al_2O_3$ (D.B.) ---------------------------- 14.7
$Na_2O$ (D.B.) ---------------------------- 0.7

The granules had a surface area of 500 m.$^2$/g. and a pore volume of 0.9 cc./g.

The nickel impregnated catalyst was prepared by impregnating 90.7 g. of the support with 59.8 ml. of an aqueous solution containing 18.57 g. of nickel nitrate (4.77 g. of NiO). The impregnated support was dried for 16 hours at 220° F. and calcined for 16 hours at 1000° F. The catalyst was reduced by heating in a hydrogen atmosphere at 450° F. for 2 hours and at 950° F. for 14 hours. The product catalyst contained 3.9 wt. percent nickel.

Three other portions of the catalyst support were impregnated with 0.5 wt. percent of platinum, rhodium, and palladium, respectively.

In this example, isoctane was employed as the model feed, and the product was predominately isobutane. The process was conducted at a pressure of 500 p.s.i.g., a space velocity of 2 and a hydrogen to hydrocarbon mole ratio of 10. The catalyst bed temperature which would provide 50 percent conversion was determined for each catalyst. Both fresh catalysts and catalysts which had been calcined at 1550° F. to simulate regeneration conditions were tested. The results are shown in Table A.

TABLE A

| Metal, wt. percent | Temp. ° F. for 50% conversion | |
|---|---|---|
| | Fresh catalyst | Calcined catalyst, 1,550° F. |
| 0.5 Pt | 440 | 573 |
| 0.5 Rh | 466 | 495 |
| 0.5 Pd | 420 | 427 |
| 3.9 Ni | 338 | 365 |

As shown in Table A, the nickel impregnated catalyst of this invention provided a far greater activity than the other three catalysts containing 0.5 wt. percent of the other metals. Lower concentrations of the metals were employed for the platinum, rhodium, and palladium impregnated samples because these metals have higher intrinsic hydrogenation activities than nickel and cobalt. The 0.5 percent concentrations of these metals have been found to be optimum concentrations.

Example 2

In this example the hydrocracking activity of the nickel impregnated Z-14 US zeolite-silicia-alumina support of this invention was compared with the activity of a similar nickel impregnated Type Y zeolite-silica-alumina support.

The nickel impregnated catalyst of this invention as described in Example 1 was employed in this test. The comparative sample was formed from a support comprising 20 wt. percent Type Y zeolite in a silica-alumina matrix containing 13 wt. percent alumina. The support was impregnated with nickel by the procedure described in Example 1. The temperatures required for 50% and 60% conversions were determined under the conditions described in Example 1 for each catalyst, and the results obtained are shown in Table B.

TABLE B

| Metal, wt. percent | Zeolite component | Temperature, °F. | |
|---|---|---|---|
| | | For 50% conversion | For 60% conversion |
| 3.9 | Z-14 US | 338 | 340 |
| 3.9 | Type Y | 430 | 463 |

Although the invention has been described with respect to nickel impregnated catalysts, it should be realized that the description is equally applicable to cobalt deposited catalysts.

Obviously, many modifications and variations of the invention as hereinabove set forth can be made without departing from the essence and scope thereof, and only such limitations should be applied as are indicated in the claims.

We claim:

1. A method for hydrocracking hydrocarbon feedstocks to obtain lower boiling hydrocarbons which comprises subjecting said feed-stock to hydrocracking conditions in the presence of added hydrogen and a catalyst, said catalyst consisting essentially of from 2 to 12 wt. percent nickel deposited on a silica-alumina-zeolite support, said support containing from 10 to 40% alumina and from 5 to 80% zeolite based on the weight of the catalyst composite, said zeolite consisting essentially of a synthetic ultra-stable crystalline alumino-silicate having the approximate formula, expressed in terms of mole ratio of oxide, as follows:

$$XM_{2/n}O:Al_2O_3:3.5-7SiO_2:0-9H_2O$$

wherein M is hydrogen, $n$ represents the valence of M, and X is from 0 to 1, said zeolite having an alkali metal content, expressed as the oxide, of less than one percent, a cubic unit cell size of from 24.20 to 24.45 Angstroms, and an ultra-stable structure as evidenced by retention of a surface area of greater than 150 m.²/g. after calcination at a temperature of 1725° F. for 2 hours.

2. The method of claim 1 wherein the catalyst contains from 13 to 35 wt. percent alumina.

3. The method of claim 1 wherein the catalyst contains from 15 to 50 wt. percent of the zeolite.

4. A petroleum hydrocracking catalyst consisting essentially of from 2 to 12 wt. percent of nickel deposited on a silica-alumina-zeolite support, said support containing from 10 to 40% alumina and from 5 to 80% zeolite based on the weight of the silica, alumina, and zeolite, said zeolite consisting essentially of a synthetic ultra-stable crystalline aluminosilicate having the approximate formula, expressed in terms of moles ratios of oxide, as follows:

$$XM_{2/n}O:Al_2O_3:3.5-7SiO_2:0-9H_2O$$

wherein M is hydrogen, $n$ represents the valence of M, and X is from 0 to 1, said zeolite having an alkali metal content, expressed as the oxide, of less than one percent, a cubic unit cell size of from 24.20 to 24.25 Angstroms, and an ultra-stable structure as evidenced by retention of a surface area of greater than 150 m.²/g. after calcination at a temperature of 1725° F. for 2 hours.

5. The catalyst of claim 4 wherein the catalyst contains from 13 to 35 wt. percent alumina.

6. The catalyst of claim 4 wherein the catalyst contains from 15 to 50 wt. percent of the zeolite.

References Cited

UNITED STATES PATENTS 3,210,265 10/1965 Garwood _____ 208—111
3,293,192 12/1966 Maher et al. _____ 252—455 X DANIEL E. WYMAN, *Primary Examiner.*

C. F. DEES, *Assistant Examiner.*

U.S. Cl. X.R.

252—455

UNITED STATES PATENT OFFICE

CERTIFICATE OF CORRECTION

Patent No. 3,431,196            March 4, 1969

Robert M. Dobres, deceased,
by Amalie B. Dobres, executrix

It is certified that error appears in the above identified patent and that said Letters Patent are hereby corrected as shown below:

Column 6, line 23, "24.25" should read -- 24.45 --.

Signed and sealed this 7th day of April 1970.

(SEAL)
Attest:

Edward M. Fletcher, Jr.

Attesting Officer

WILLIAM E. SCHUYLER, JR.

Commissioner of Patents